(12) United States Patent
Hirata et al.

(10) Patent No.: US 6,262,412 B1
(45) Date of Patent: Jul. 17, 2001

(54) OPTICAL PICK-UP POSITION DETECTOR HAVING A MOTOR WITH A CONTROLLED DRIVING VOLTAGE

(75) Inventors: Minoru Hirata, Yokohama; Masakazu Hijikata, Zama, both of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/369,934

(22) Filed: Aug. 9, 1999

(30) Foreign Application Priority Data

Sep. 9, 1998 (JP) .................................................. 10-270472

(51) Int. Cl.[7] .................................................. H01J 40/14
(52) U.S. Cl. .................................. 250/214 R; 250/201.5; 369/44.29
(58) Field of Search ........................... 250/214 R, 214 LS, 250/201.5, 559.29; 369/44.29, 44.26, 44.35, 44.14

(56) References Cited

U.S. PATENT DOCUMENTS 4,142,209 * 2/1979 Hedlund et al. .................... 369/75.2
5,631,886    5/1997 Suzuki ........................... 369/44.25

FOREIGN PATENT DOCUMENTS 0770993    5/1997 (EP).

* cited by examiner

Primary Examiner—Que T. Le
(74) Attorney, Agent, or Firm—Connolly Bove Lodge & Hutz LLP

(57) ABSTRACT

In an optical pick-up position detector, an optical pick-up is movable by a motor in radial directions of an optical disk for detecting signals on the optical disk. A driver applies a driving voltage to terminals of the motor for forward or reverse rotation of the motor according to a control signal from a controller. The controller has an input terminal connected to a power supply via a resistor and further has a control terminal for outputting the control signal to the driver according to an electric potential at the input terminal of the controller. A switch is disposed between the input terminal of the controller and one of the terminals of the motor. The switch changes its operating state when the optical pick-up moves to exceed a reference position in a radially inward or outward direction with respect to the optical disk. The switch may be connected to the input terminal of the controller via a diode.

4 Claims, 7 Drawing Sheets

OPTICAL PICK-UP POSITION DETECTOR HAVING A MOTOR WITH A CONTROLLED DRIVING VOLTAGE

BACKGROUND OF THE INVENTION

1. Field of the Invention

The present invention relates to an optical pick-up position detector for detecting a position of an optical pick-up for use in a recording/reproducing device for an optical disk such as a compact. disk.

2. Description of the Related Art

In recent years, optical disks have been used in various technical fields as recording media capable of mass data recording, and optical disk recording/reproducing devices have been actively improved for speeding up recording/reproducing of data relative to the optical disks. FIG. 5 shows a suspension chassis structure of a compact disk player which has been generally used. In FIG. 5, numeral 1 denotes an optical pick-up for reading and writing data relative to an optical disk 6, 2 a traverse motor for driving the optical pick-up 1, 3 a lead screw, and 4 a guide shaft. The lead screw 3 has a thread which meshes with a thread of a joint portion 5 of the optical pick-up 1. The rotation of the traverse motor 2 is transmitted to the lead screw 3 via gears and then to the optical pick-up I via the joint portion 5 so that the optical pick-up 1 is moved in a radial direction, i.e. radially inward or outward, with respect to the optical disk 6.

When the optical disk 6 is inserted, the compact disk player once moves the optical pick-up 1 to the radially innermost position of he optical disk 6 for detecting a position of the optical pick-up 1. When the optical pick-up 1 reaches the innermost position, the optical pick-up 1 pushes an inner switch 7 provided in the suspension chassis structure so that the switch 7 is closed to the ON state. In response to the closing operation of the switch 7, the traverse motor 2 starts reverse rotation so that the optical pick-up 1 starts to move radially outward.

A series of the foregoing operations are controlled by an optical pick-up position detection circuit of the compact disk player. FIG. 6 shows a structure of the conventional position detection circuit, while FIG. 7 shows a timing chart for explaining an operation of the conventional position detection circuit. As shown in FIG. 6, the conventional position detection circuit comprises a suspension chassis section 8, a relay connector section 9 and a main substrate section 10. While the switch 7 is open (OFF state), a high-level signal S5 of a given voltage is inputted into a microcomputer 13 via a resistor 12 from a power supply 11 for the microcomputer 13. In response to the signal S5, the microcomputer 13 outputs a signal S4 to a driver IC 14 so that the driver IC 14 gives a high-level signal S1 to a relay connector terminal P1 and a low-level signal S2 to a relay connector terminal P2. As a result, the traverse motor 2 is rotated to move the optical pick-up 1 radially inward. In FIG. 6, numeral 15 denotes a power supply for the driver IC 14.

When the optical pick-up 1 reaches the radially innermost position to push and close the switch 7 to the ON state, the voltage of the power supply 11 reaches the ground 17 via relay connector terminals P3 and P4. Thus, signals S3 and S6 as well as a signal S5 which is inputted into the microcomputer 13 become approximately OV, i.e. a low level. In response to the low-level signal S5, the microcomputer 13 outputs a signal S4 to the driver IC 14 so that the driver IC 14 gives a low-level signal S1 to the terminal P1 and a high-level signal S2 to the terminal P2. As a result, the traverse motor 2 starts reverse rotation to move the optical pick-up 1 radially outward.

In the foregoing conventional position detection circuit, however, the control implemented by the microcomputer 13 according to the state of the switch 7 is independent of the polarity of the voltage applied to the traverse motor 2, and thus, four relay connector terminals are required. Further, although the information about the state (ON/OFF) of the switch 7 is fed to the microcomputer 13, no information about the polarity of the voltage applied to the traverse motor 2 is fed back to the microcomputer 13.

SUMMARY OF THE INVENTION

Therefore, it is an object of the present invention to provide an improved optical pick-up position detector.

According to one aspect of the present invention, there is provided an optical pick-up position detector comprising an optical pick-up movable in radial directions of an optical disk for detecting signals on the optical disk; a motor for generating driving forces for moving the optical pick-up in the radial directions; a driver for applying a driving voltage to terminals of the motor for forward or reverse rotation of the motor according to a control signal; a controller having an input terminal connected to a power supply via a resistor and having a control terminal for outputting the control signal to the driver according to an electric potential at the input terminal; and a switch disposed between the input terminal of the controller and one of the terminals of the motor, the switch changing its operating state when the optical pick-up moves to exceed a reference position in a radially inward or outward direction with respect to the optical disk.

It may be arranged that the switch is connected to the input terminal of the controller via a diode.

It may be arranged that the diode is disposed so that a forward bias is applied thereto when the electric potential at the input terminal of the controller is higher than an electric potential at an opposite side of the diode.

It may be arranged that when the controller controls the driver to apply the driving voltage to the terminals of the motor for the forward rotation thereof, the optical pick-up moves to exceed the reference position in the radially inward direction to close the switch so that the input terminal of the controller is connected to the one of the terminals of the motor via the diode, and that when the controller controls the driver to apply the driving voltage to the terminals of the motor for the reverse rotation thereof while the switch is closed, the driver applies to the one of the terminals of the motor an electric potential which is higher than the electric potential at the input terminal of the controller.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, preferred embodiments of the present invention will be described hereinbelow with reference to the accompanying drawings.

First Embodiment

Figure 5:
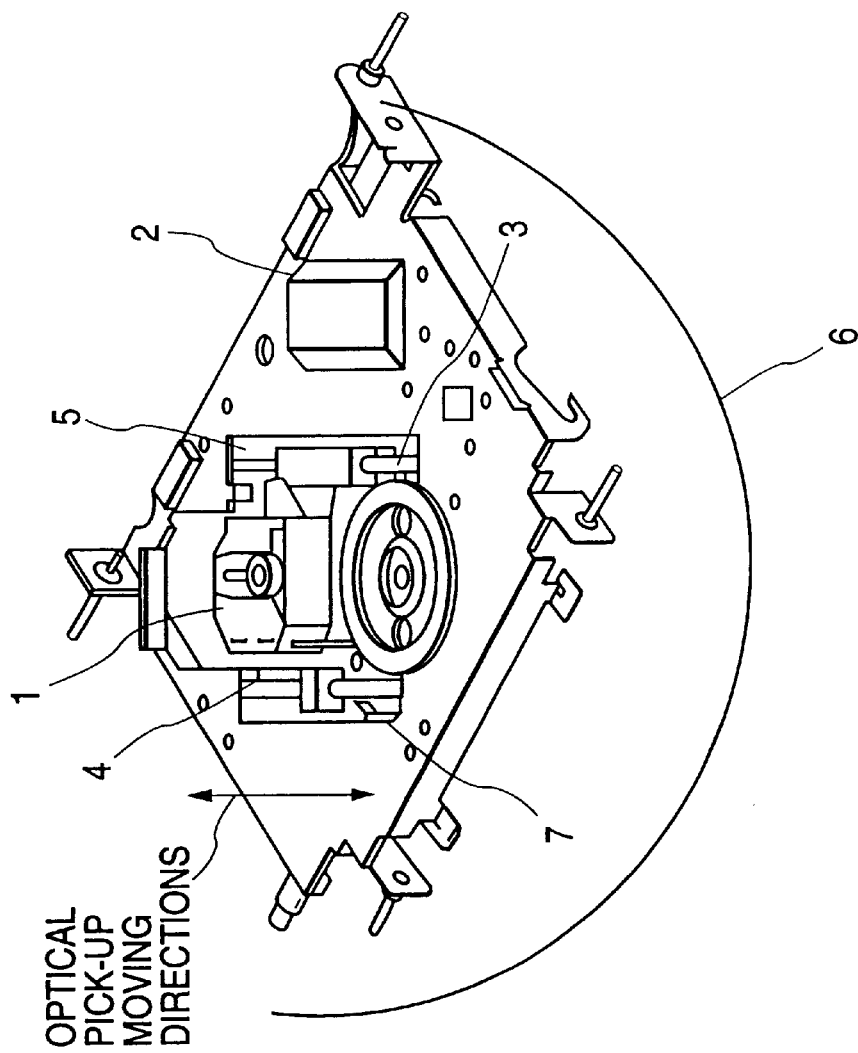
FIG. 5. is a schematic perspective view showing a suspension chassis structure of a conventional compact disk player.

In this embodiment, a suspension chassis structure of a compact disk player is the same as that shown in FIG. 5. Specifically, in FIG. 5, numeral 1 denotes an optical pick-up for reading and writing data relative to an optical disk 6 as a recording medium, 2 a traverse motor for driving the optical pick-up 1, 3 a lead screw, and 4 a guide shaft. The lead screw 3 has a thread which meshes with a thread of a joint portion 5 of the optical pick-up 1. The rotation of the traverse motor 2 is transmitted to the lead screw 3 via gears and then to the optical pick-up 1 via the joint portion 5 so that the optical pick-up 1 is moved in a radial direction, i.e. radially inward or outward, with respect to the optical disk 6.

When the optical disk 6 is inserted, the compact disk player once moves the optical pick-up 1 to the radially innermost position of the optical disk 6 for detecting a position of the optical pick-up 1. The innermost position is a reference position which is located radially inward of positions where information recorded on the optical disk 6 can be read, while located radially outward of positions where the optical pick-up I collides with a motor. When the optical pick-up 1 reaches the innermost position, the optical pick-up 1 pushes an inner switch 7 provided in the suspension chassis structure so that the switch 7 is closed to the ON state. In response to the closing operation of the switch 7, the traverse motor 2 starts reverse rotation so that the optical pick-up 1 starts to move radially outward. Unless the traverse motor 2 starts the reverse rotation, the optical pick-up 1 collides against the motor to cause mechanical failure in the worst case. As a result, upon trying to make the reverse rotation of the traverse motor 2 thereafter, it is possible that the optical pick-up 1 is not moved radially outward due to the mechanical failure.

Figure 1:
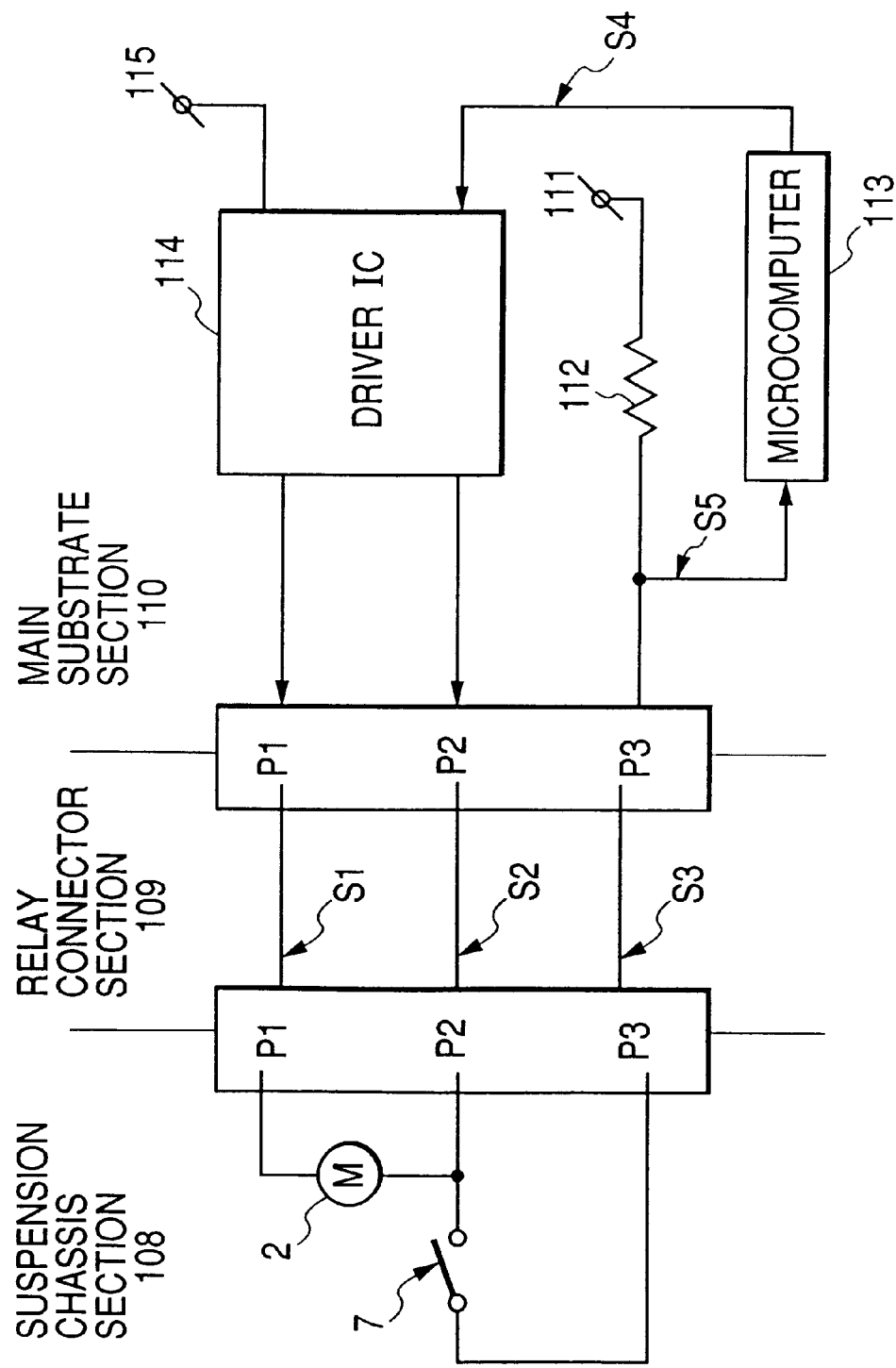
FIG. 1 is a block diagram showing a structure of an optical pickup position detection circuit of a compact disk player according to a first preferred embodiment of the present invention.
Figure 2:
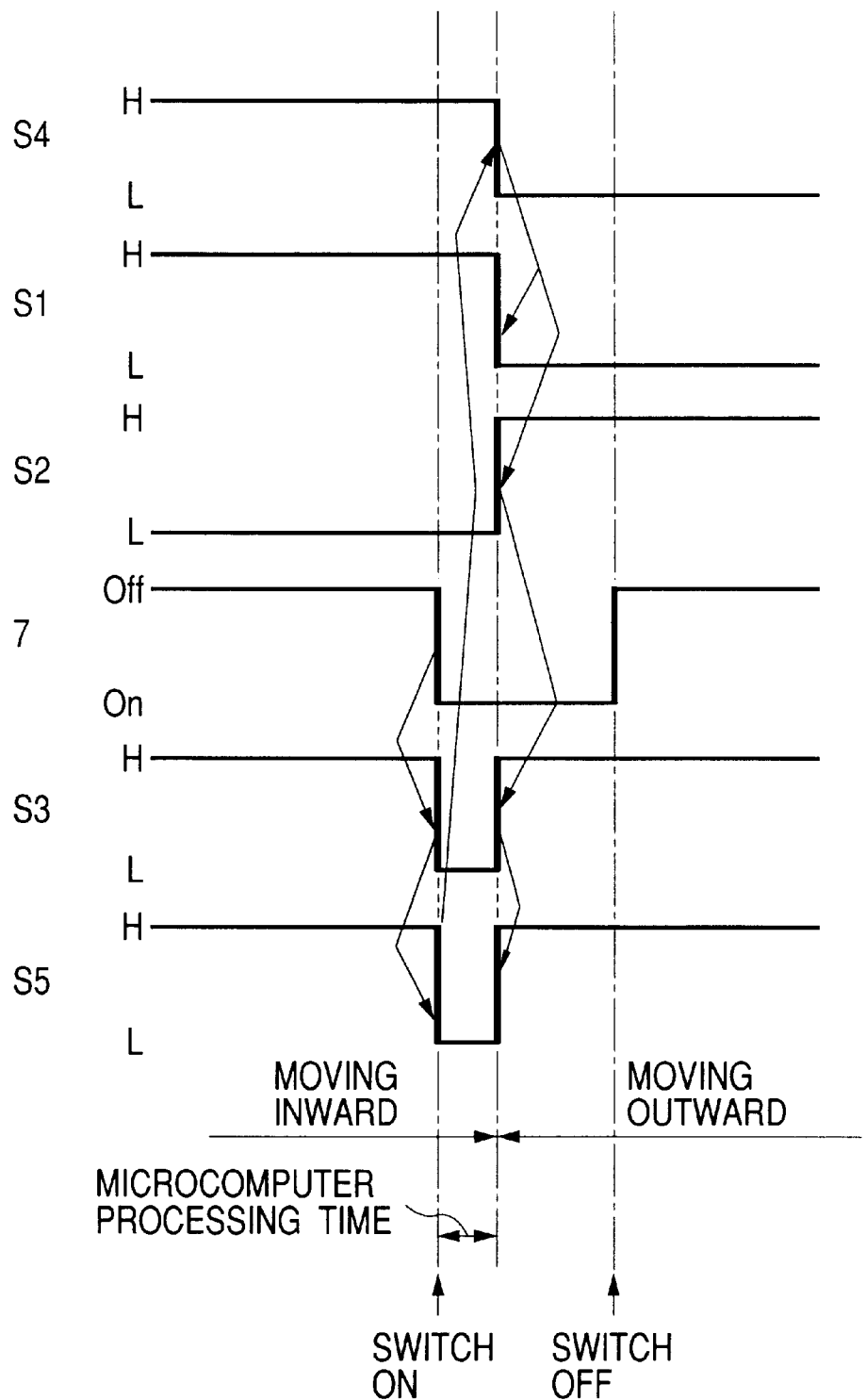
FIG. 2 is a timing chart for explaining an operation of the position detection circuit shown in FIG. 1.

A series of the foregoing operations are controlled by an optical pick-up position detection circuit of the compact disk player. FIG. 1 shows a structure of the position detection circuit in this embodiment, while FIG. 2 shows a timing chart for explaining an operation of the position detection circuit in this embodiment. As shown in FIG. 1, the position detection circuit comprises a suspension chassis section 108, a relay connector section 109 and a main substrate section 110. In FIG. 1, numeral 2 denotes the traverse motor and 7 the inner switch, which are included in the suspension chassis section 108. Further, numeral 111 denotes a power supply for a microcomputer 113 which controls an operation of the position detection circuit for the optical pick-up 1, 112 a resistor and 114 a driver IC for driving the position detection circuit, which are included in the main substrate section 110. The microcomputer 113 is provided with a control IC for outputting a control signal to the driver IC 114. The driver IC 114 applies a driving voltage to terminals of the traverse motor 2 for forward or reverse rotation thereof according to the control signal from the control IC of the microcomputer 113. The microcomputer 113 has an input terminal connected to the power supply 111 via the resistor 112, and outputs the control signal from a control terminal thereof to the driver IC 114 according to the electric potential at the input terminal thereof. The switch 7 is disposed between the input terminal of the microcomputer 113 and one of the terminals of the traverse motor 2. The switch 7 changes its operating state, i.e. between the ON state and the OFF state, when the optical pick-up 1 moves to exceed the foregoing reference position in a radially inward or outward direction. Specifically, the switch 7 changes from the OFF state to the ON state when the optical pick-up 1 moves radially inward to contact the switch 7 and from the ON state to the OFF state when the optical pick-up 1 moves radially outward to be separated from the switch 7.

In this embodiment, when the optical disk 6 is inserted, the optical pick-up 1 once moves to the innermost position (reference position) of the optical disk 6 to abut the switch 7 so that the switch 7 changes from the OFF state to the ON state. While the switch 7 is OFF, a high-level signal S5 of a given voltage is inputted into the microcomputer 113 from the power supply 111 via the resistor 112. In response to the signal S5, the microcomputer 113 feeds a control signal S4 to the driver IC 114 so that the driver IC 114 applies a high-level signal S1 to a relay connector terminal P1 and a low-level signal S2 to a relay connector terminal P2. In response to the signals S1 and S2, the traverse motor 2 is rotated to move the optical pick-up 1 radially inward so that the optical pick-up 1 reaches the innermost position to push and close the switch 7 to the ON state.

When the switch 7 changes to the ON state, the signal S5 fed to the microcomputer 113 changes from the high level to the low level since the signal S2 at the relay connector terminal P2 is at the low level. Accordingly, the approximately zero voltage is applied to the microcomputer 113 so that the microcomputer 113 feeds a corresponding control signal S4 to the driver IC 114. In response to the control signal S4, the driver IC 114 feeds a low-level signal S1 to the relay connector terminal P1 and a high-level signal S2 to the relay connector terminal P2. As a result, the traverse motor 2 starts reverse rotation to move the optical pick-up 1 radially outward.

Figure 6:
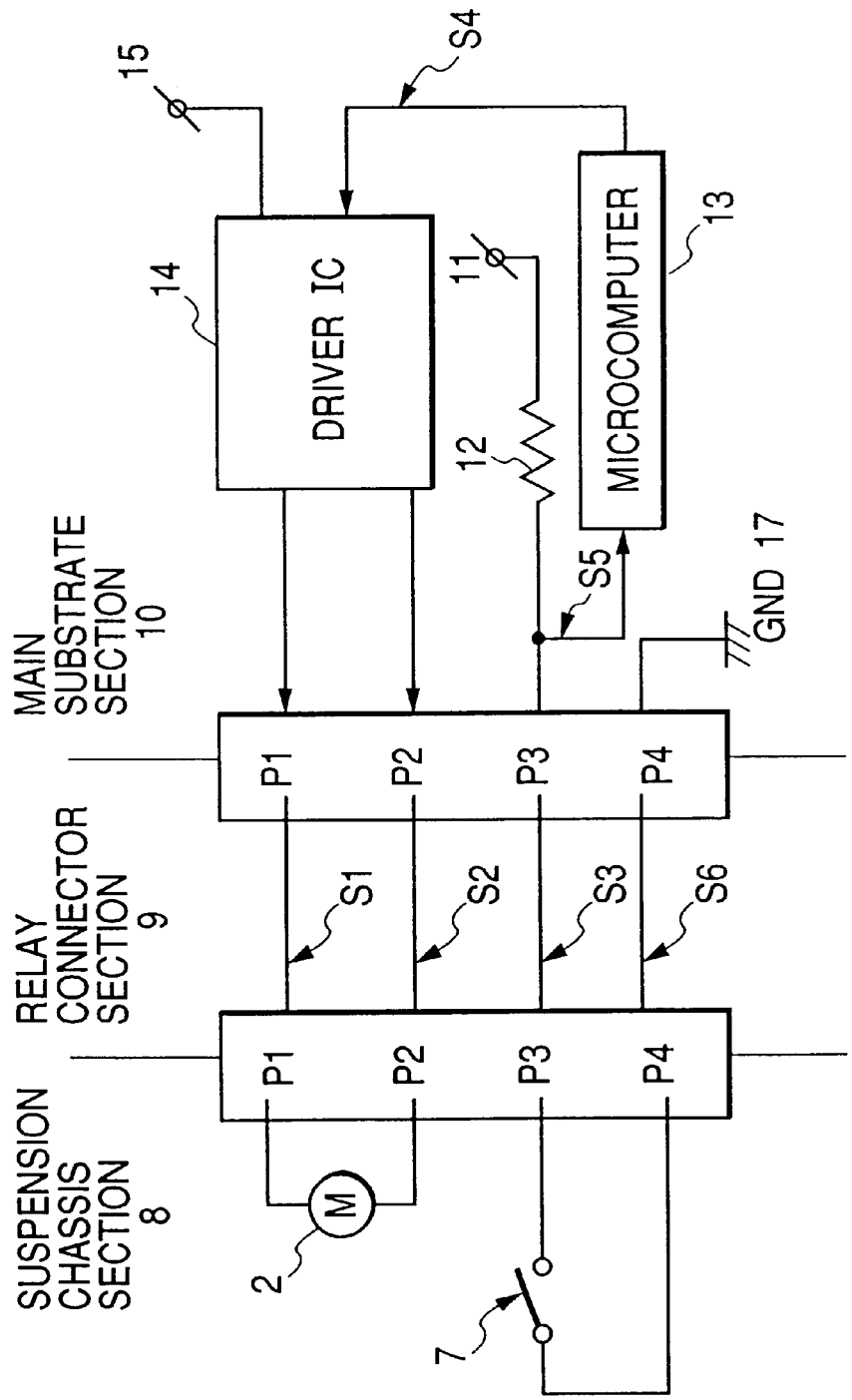
FIG. 6 is a block diagram showing a structure of an optical pickup position detection circuit of the conventional compact disk player.
Figure 7:
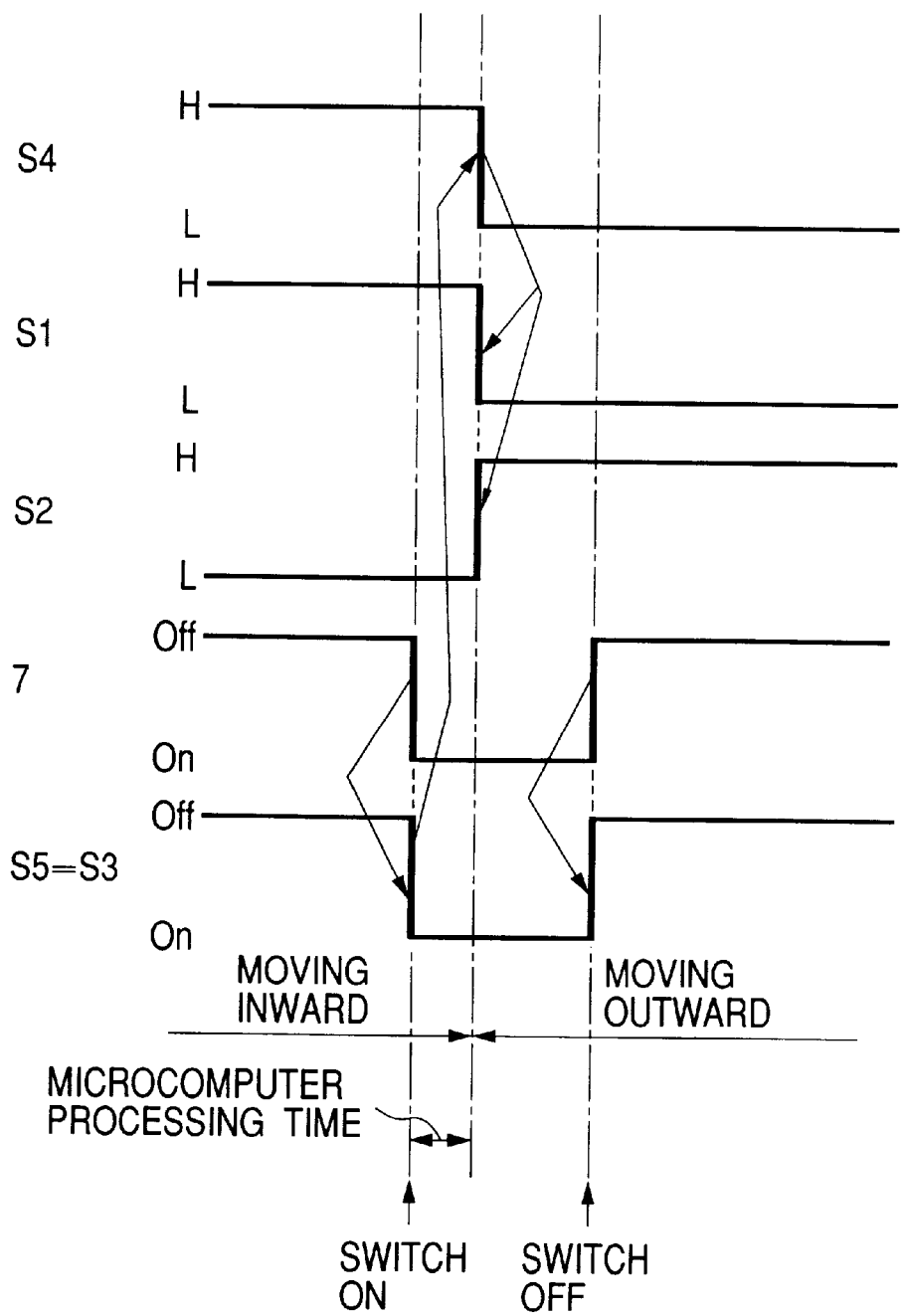
FIG. 7 is a timing chart for explaining an operation of the conventional position detection circuit shown in FIG. 6.

According to the foregoing first preferred embodiment, since the number of the relay connector terminals in the optical pick-up position detection circuit can be reduced as compared with the conventional circuit shown in FIG. 6, the reduction in cost and size can be accomplished. Further, since the change in polarity of the voltage applied to the traverse motor 2 can be detected at the microcomputer 113 while the switch 7 is ON as seen from the timing chart shown in FIG. 2, mechanical error or failure if caused can be found out. Moreover, since the change in polarity of the voltage applied to the traverse motor 2 can be detected at the microcomputer 113 while the switch 7 is ON, i.e. before the switch 7 changes from the ON state to the OFF state as seen from the timing chart shown in FIG. 2, a subsequent control may be started earlier as compared with the conventional circuit shown in FIG. 6.

Second Embodiment

Figure 3:
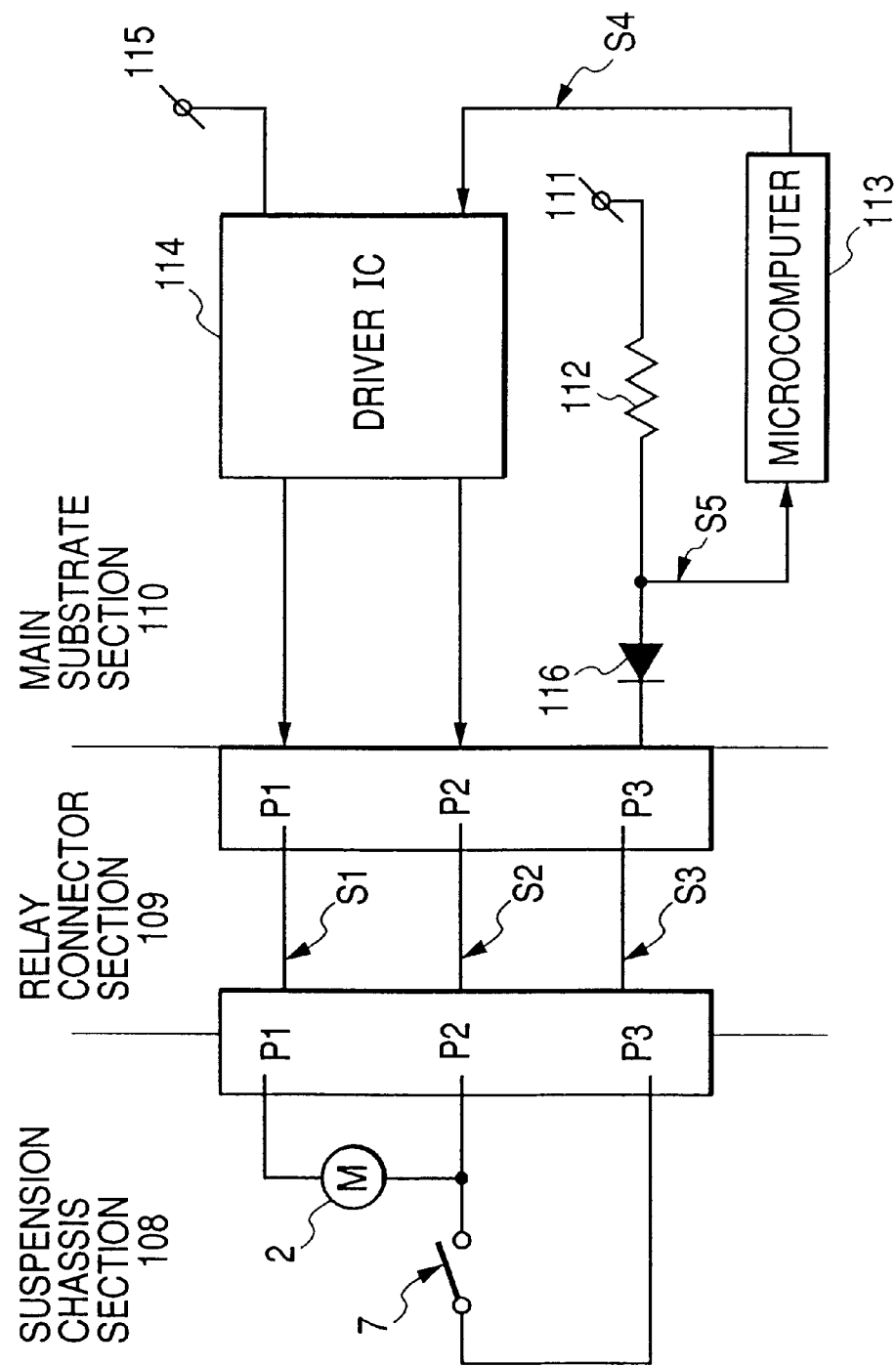
FIG. 3 is a block diagram showing a structure of an optical pickup position detection circuit of a compact disk player according to a second preferred, embodiment of the present invention.
Figure 4:
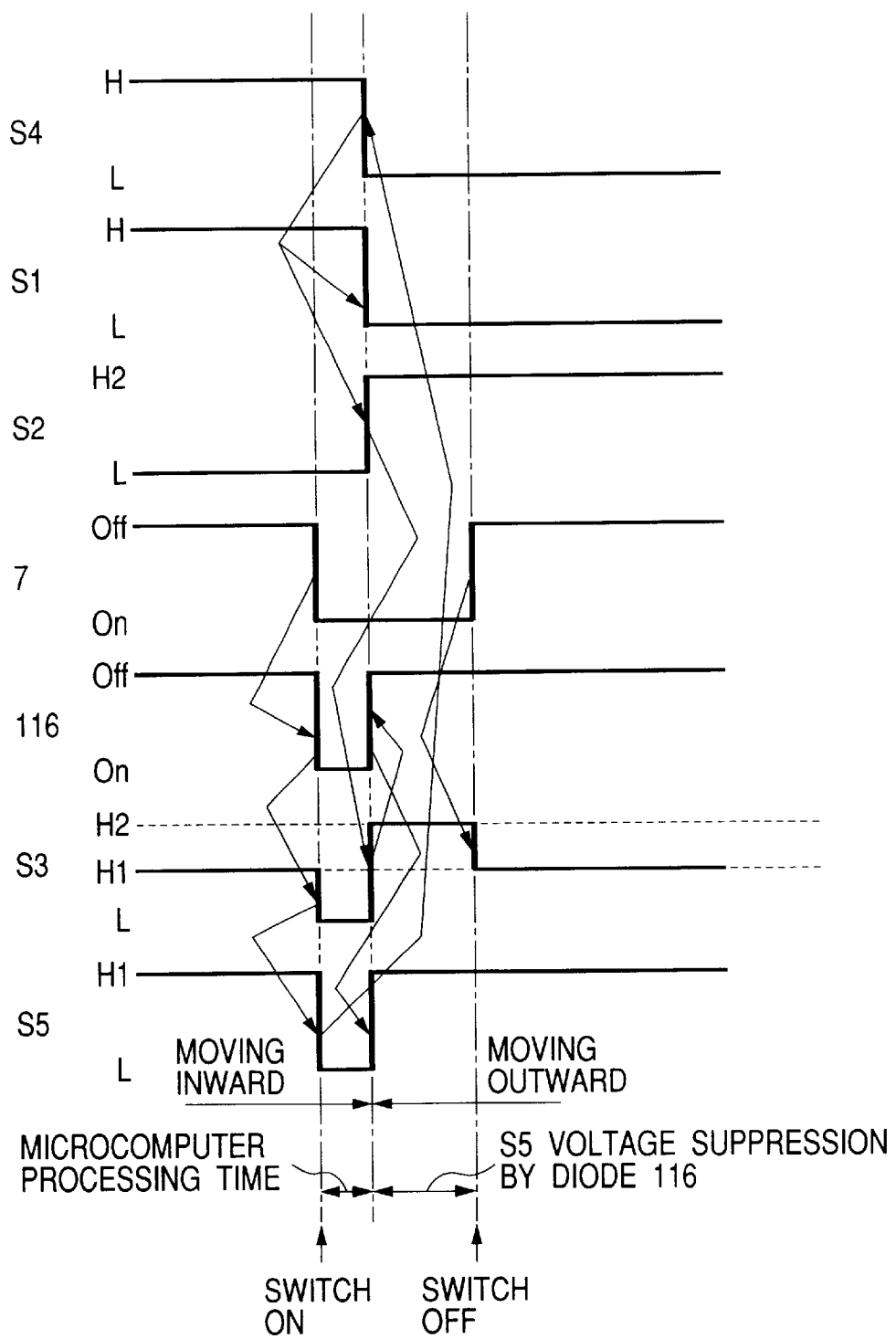
FIG. 4. is a timing chart for explaining an operation of the position detection circuit shown in FIG. 3.

FIG. 3 shows a structure of an optical pick-up position detection circuit of a compact disk player in this embodiment, while FIG. 4 shows a timing chart for explaining an operation of the position detection circuit in this embodiment. This embodiment differs from the foregoing first preferred embodiment In that a diode 116 is disposed between the switch 7 and the microcomputer 113. In this embodiment, a high-level signal (S1 or S2) applied to the traverse motor 2 is set higher in potential than a high-level signal S5 provided by the power supply 111. In the following description, the level of the high-level signal S2 applied to the traverse motor 2 will be referred to as H2, while the level of the high-level signal S5 will be referred to as H1.

An operation of the circuit shown in FIG. 3 is the same as that of the first preferred embodiment while the switch 7 is OFF. In this state, the voltage level of a signal S3 at the relay connector terminal P3 is equal to that of the signal S5 and set to H 1. When the optical pick-up 1 reaches the innermost position to push and close the switch 7 to the ON state, the signal S3 changes to a low level so that the diode 116 turns on. When the diode 116 turns on, the signal S5 fed to the microcomputer 113 changes to a low level in response to the low level of the signal S3. As a result, a signal S4 fed to the driver IC 114 from the microcomputer 113 changes to a low level so that the driver IC 114 feeds a low-level signal SI to the relay connector terminal P1 and a signal S2 of the high level H2 to the relay connector terminal P2. Thus, the traverse motor 2 starts reverse rotation to move the optical pick-up 1 radially outward.

Since the switch 7 has a mechanical stroke, it Is possible that the signal S2 fed to the relay connector terminal P2 is at the high level H2 while the switch 7 is ON. In this case, the signal S3 at the relay connector terminal P3 is also at the high level H2. Since H2 is set greater than H1 as described above, the diode 116 turns off to prevent the level of the signal S5 from exceeding the level H1. In response to the turning-off of the diode 116, the signal S5 fed to the microcomputer 113 reaches the high level H1.

When the optical pick-up 1 moves radially outward so that the switch 7 changes to the OFF state, the signal S3 at the relay connector terminal P3 changes from H2 to H1 in response to the opening operation of the switch 7. The diode 116 may be disposed at any position, regardless of the main substrate section 110, the relay connector section 109 and the suspension chassis section 108, between a position where a line connected to the power supply 111 via the resistor 112 and a line connected to the microcomputer 113 join each other, and the switch 7.

According to the foregoing second preferred embodiment, in addition to the effects achieved by the foregoing first preferred embodiment, the voltage higher than the allowable voltage of the microcomputer 113 is prohibited from being applied thereto as seen from the timing chart shown in FIG. 4 so that damage to the microcomputer 113 can be prevented.

While the present invention has been described in terms of the preferred embodiments, the invention is not to be limited thereto, but can be embodied in various ways without departing from the principle of the invention as defined in the appended claims.

What is claimed is:

1. An optical pick-up position detector comprising:

an optical pick-up movable in radial directions of an optical disk for detecting signals on said optical disk;

a motor for generating driving forces for moving said optical pick-up in said radial directions;

a driver for applying a driving voltage to terminals of said motor for forward or reverse rotation of said motor according to a control signal;

a controller having an input terminal connected to a power supply via a resistor and having a control terminal for outputting said control signal to said driver according to an electric potential at said input terminal; and a switch disposed between the input terminal of said controller and one of the terminals of said motor, said switch changing its operating state when said optical pick-up moves to exceed a reference position in a radially inward or outward direction with respect to said optical disk.

2. The optical pick-up position detector according to claim 1, wherein said switch is connected to the input terminal of said controller via a diode.

3. The optical pick-up position detector accordirig to claim 2, wherein said diode is disposed so that a forward bias is applied thereto when the electric potential at the input terminal of said controller is higher than an electric potential at an opposite side of said diode.

4. The optical pick-up position detector according to claim 3, wherein when the controller controls the driver to apply the driving voltage to the terminals of said motor for the forward rotation thereof, the optical pick-up moves to exceed said reference position in the radially inward direction to close said switch so that the input terminal of said controller is connected to said one of the terminals of the motor via said diode, and wherein when the controller controls the driver to apply the driving voltage to the terminals of said motor for the reverse rotation thereof while the switch is closed, the driver applies to said one of the terminals of the motor an electric potential which is higher than the electric potential at the input terminal of said controller.

* * * * *

UNITED STATES PATENT AND TRADEMARK OFFICE
CERTIFICATE OF CORRECTION

PATENT NO.   : 6,262,412 B1
DATED        : July 17, 2001
INVENTOR(S)  : Minoru Hirata et al.

It is certified that error appears in the above-identified patent and that said Letters Patent is hereby corrected as shown below:

<u>Title page, Item [54] and Column 1, lines 1-3,</u>
In the title please change the title from "OPTICAL PICK-UP POSITION DETECTOR HAVING A MOTOR WITH A CONTROLLED DRIVING VOLTAGE" to -- OPTICAL PICK-UP POSITION DETECTOR --.

Signed and Sealed this

Twenty-ninth Day of October, 2002

*Attest:*

*Attesting Officer*

JAMES E. ROGAN
*Director of the United States Patent and Trademark Office*